United States Patent

[11] 3,611,138

| [72] | Inventor | Gary L. Winebrener<br>Fraser, Mich. |
|---|---|---|
| [21] | Appl. No. | 16,809 |
| [22] | Filed | Mar. 5, 1970 |
| [45] | Patented | Oct. 5, 1971 |
| [73] | Assignee | General Motors Corporation<br>Detroit, Mich. |

[54] TACHOMETER SYSTEM INCLUDING AN RF SIGNAL MODULATOR AND DETECTOR
4 Claims, 3 Drawing Figs.

| [52] | U.S. Cl. | 324/173, 318/231 |
|---|---|---|
| [51] | Int. Cl. | G01p 3/48 |
| [50] | Field of Search | 324/166, 173, 174, 175, 340 SC, 161; 317/5; 318/52, 231; 73/229–231; 332/56 |

[56] References Cited
UNITED STATES PATENTS

| 3,002,384 | 10/1961 | MacDonald | 324/173 |
| 3,433,070 | 3/1969 | Grimaldi | 73/229 |
| 3,455,162 | 7/1969 | Michener | 73/231 |

*Primary Examiner*—Michael J. Lynch
*Attorneys*—E. W. Christen, C. R. Meland and Albert F. Duke ABSTRACT: A tachometer system for detecting the speed of rotation of a rotating member. In this tachometer system, an LC tank circuit is excited by an RF signal. The inductance of the coil incorporated in the LC tank circuit is varied in accordance with the rotation of the rotating member and, accordingly, an amplitude modulated RF signal is developed across the tank circuit in response to rotation of the rotating member. This modulation is doubled in amplitude and detected to provide a signal whose frequency is related to the speed of rotation of the rotating member.

INVENTOR.
BY Gary L. Winebrener
C. R. Meland
ATTORNEY

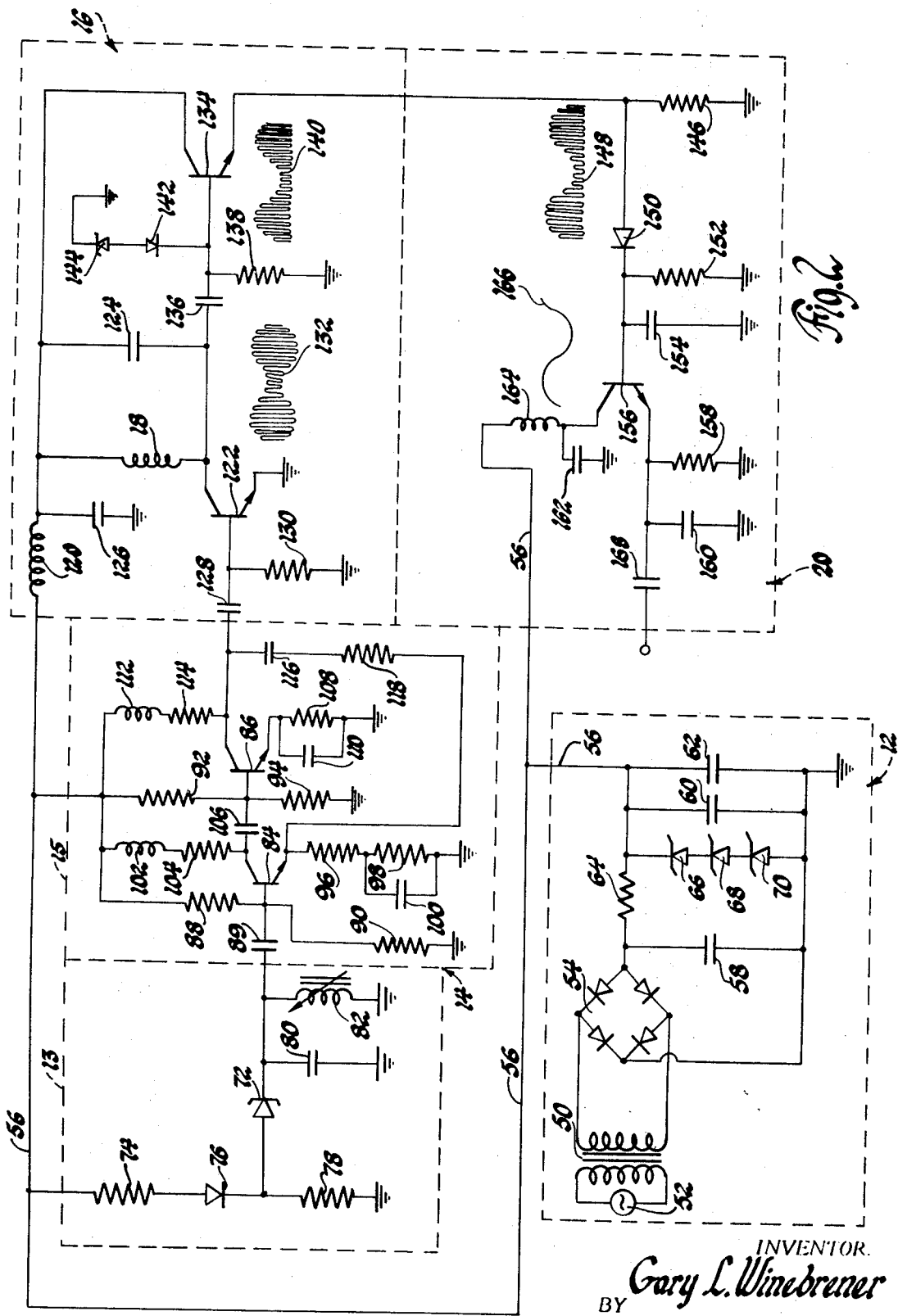

TACHOMETER SYSTEM INCLUDING AN RF SIGNAL MODULATOR AND DETECTOR

This invention relates to a tachometer system for detecting the speed of rotation of a rotating member and for providing electrical signals representative thereof. In the tachometer of this system, a sensing coil incorporated in an LC tank circuit interacts with the rotating member being monitored. This interaction of the coil with the rotating member causes the inductance of the coil to vary and, concomitantly, the impedance of the LC tank circuit is varied. These impedance variations in the LC tank circuit cause amplitude modulation of an RF signal impressed across the tank circuit. The frequency of this modulation signal is correlated with the speed of rotation of the rotating member and, therefore, affords an indication thereof.

The tachometer of this invention is suitable for incorporation in an induction motor constant slip frequency system. In this application, the tachometer's output speed indication is employed in conjunction with auxiliary electrical signals to control the frequency of power supplied the induction motor under control. This control affords regulation of the induction motor's slip frequency. Demands made on the tachometer system when incorporated in a motor control network are quite severe and, therefore, a rugged, sensitive system with considerable versatility is required.

Accordingly, it is an object of the present invention to provide a tachometer system capable of accurate speed measurements.

Another object of the present invention is to provide a rugged, durable tachometer system which is essentially immune to vibration and to environmental factors such as oil spray, dust, and stray magnetic fields. This versatility is advantageous when the tachometer is incorporated in a motor control system in various other applications where similar environmental conditions are encountered.

A further object of this invention is to provide a tachometer system which affords wide tolerance latitude, thus facilitating tachometer manufacture and assembly.

Another object of the present invention is to provide a tachometer which is capable of detecting relatively high speeds. This high-speed capability is a prerequisite for various motor control applications.

Still another object of this invention is to provide a tachometer system with enhanced sensitivity by providing an arrangement that doubles the amplitude of the induced signal which represents the speed of rotation.

Additional objects and advantages of the present invention will be apparent in light of the following description.

The accompanying drawings which disclose a preferred embodiment of the present invention are incorporated in the description.

In the drawings:

FIG. 2 is a circuit diagram of the tachometer system of this invention.

Figure 1:
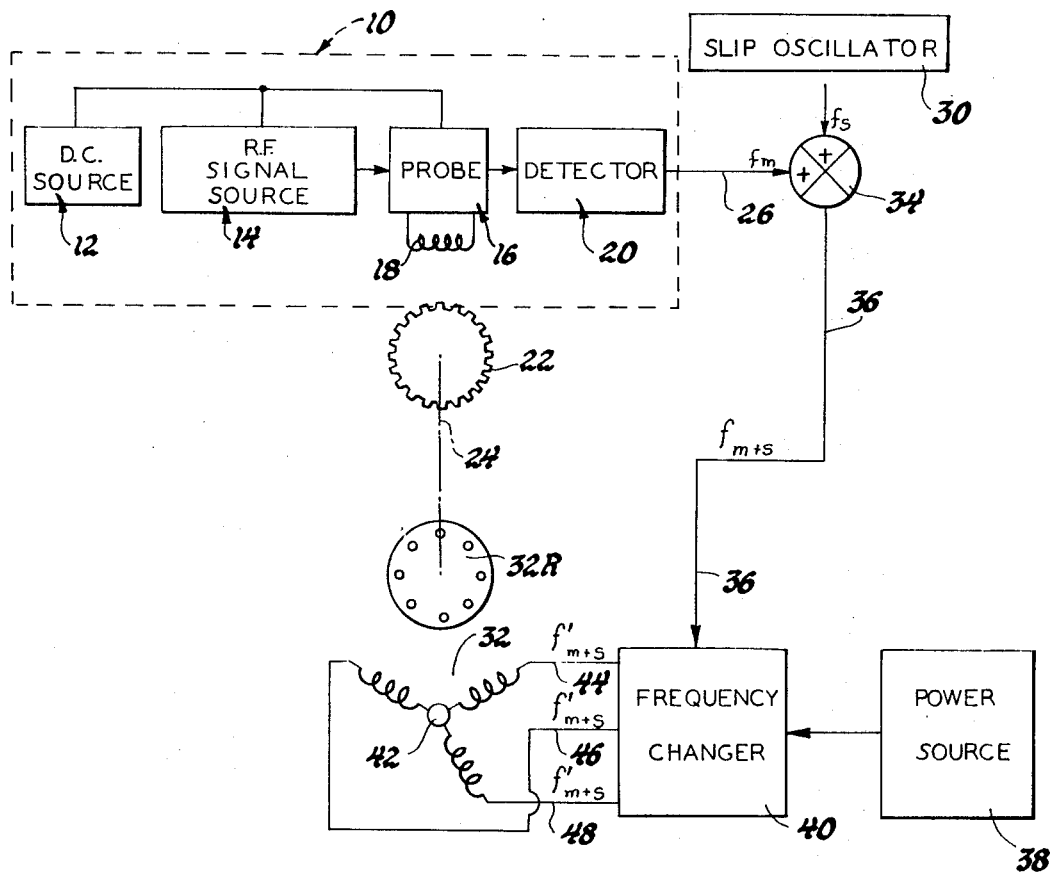
FIG. 1 is a block diagram of an induction motor slip frequency control system wherein the tachometer of the present invention is employed.

Referring now to the drawings and more particularly to FIG. 1, a block diagram of an induction motor slip frequency control system is illustrated which utilizes a tachometer made in accordance with the present invention.

In FIG. 1, reference numeral 10 generally designates the tachometer system. This system is comprised of a DC power source 12, an RF signal source 14, a probe 16, a sensing coil 18, and a detector 20. The sensing coil 18 a disposed in proximity to a nonmagnetic, metallic toothed wheel 22 preferably formed of aluminum which is carried by a shaft 24 which is the rotating member whose speed of rotation is to be monitored. The toothed wheel 22 and the sensing coil 18 interact in a manner facilitating the development of a signal at the output of the tachometer on conductor 26 which is indicative of the speed of rotation of the metallic toothed wheel 22. All of the above is more fully described hereinafter.

A slip frequency oscillator 30 is provided which has an adjustable output frequency. In the motor control system of FIG. 1, the slip frequency signal generated by this slip frequently oscillator 30 will determine the slip frequency of the induction motor 32. The frequency adder 34, which may take various conventional forms, combines the frequency of the tachometer output at conductor 26 with the frequency of the slip frequency oscillator 30. The signal at the output of the adder on the conductor 36 has a frequency which is equal to the sum of the frequency of the tachometer 10 and the frequency of the slip frequency oscillator 30. As noted above, this frequency will determine the frequency of power applied to the induction motor 32.

Power source 38 in FIG. 1 generally represents a source of electric power which powers the induction motor under control. This power source can take the form of an AC power source or in the alternative a DC power source.

A frequency changer 40 is interposed between the power source 38 and the phase windings 42 of the induction motor 32. The signal on the conductor 36 at the input to the frequency changer 40 has a frequency $f_{m+s}$ which is equal to the sum of the motor shaft speed $f_m$ and the slip oscillator frequency $f_s$. This signal from the conductor 36 controls the frequency changer 40 so that energy from the power source 38 is converted to energy at a frequency which is a function of the frequency of the signal from conductor 36. Accordingly, the voltage delivered to the motor windings 42 on the conductors 44, 46, and 48 has a frequency equal to $f'_{m+s}$ which is a function of the sum of the motor shaft speed $f_m$ and the slip oscillator frequency $f_s$.

The frequency changer 40 can take a wide variety of forms generally known to those skilled in the art. For instance, where the power source 38 is a direct current source, the frequency changer 40 will take the form of a DC to AC inverter having a controllable output whose frequency is dictated by the signal on line 36. In the alternative, the frequency changer 40 can be an AC to AC converter in which case the power source 38 will be a source of alternating current. In either case, it is preferred that the frequency changer be of a type that utilizes controlled rectifiers as the switching elements.

The squirrel cage rotor 32R of the induction motor 32 rotates at a speed $f_m$ different from the synchronous speed associated with the frequency $f'_{m+s}$ of the power supplied to the windings 42 by the slip frequency $f_s$. This speed of rotation determines the speed of rotation of the shaft 24 which, as noted above, carries the toothed wheel 22 which provides a control signal to the tachometer 10. In this manner, a servoloop is closed such that the slip frequency is constrained to a value set by the slip frequency oscillator 30.

Referring now to FIG. 2, a detailed circuit schematic of the tachometer system denoted 10 in FIG. 1 is illustrated. The RF signal source 14 of FIG. 1 is shown in FIG. 2 to be comprised of an RF oscillator 13 and an RF amplifier 15.

In FIG. 2, the DC power supply 12 provides DC power to various sections of the tachometer system. This power supply includes a transformer 50 connected with a source of alternating current 52 and a full wave bridge rectifier 54 for converting power line energy to DC. The direct voltage supplied to the conductor 56 is regulated and filtered by capacitors 58, 60, 62, resistor 64, and Zener diodes 66, 68, and 70. In this manner, the requisite DC voltage is applied between the conductor 56 and ground. The capacitors 60 and 62 also effectively shunt any RF signals which appear on the conductor 56 to ground.

A conventional tunnel diode RF oscillator 13 including the tunnel diode 72 generates an RF signal for the tachometer. In this oscillator, DC voltage is supplied by the conductor 56 to a series combination of a resistor 74, a diode 76, and a resistor 78 to provide the input power to the tunnel diode oscillator. The oscillator's frequency of operation is dependent on the parameter values of both the capacitor 80 and the inductor 82.

The RF signal generated by the tunnel diode oscillator 13 is amplified by the two stage amplifier 15 comprised of transistors 84 and 86 which receive DC base bias through the resistor networks comprised of resistors 88, 90 and 92, 94. The input stage of the two stage amplifier 15 of FIG. 2 is comprised of transistor 84, in combination with its required circuitry. Emitter resistors 96 and 98 are connected to the emitter of this transistor and a bypass capacitor 100 bypasses part of the total emitter resistance, resistor 98, for RF purposes. The DC bias from conductor 56 is passed to the collector of the transistor 84 through an RF choke 102 and a resistor 104. RF from the RF oscillator 13 is coupled to the base of the transistor 84 through a coupling capacitor 89.

Capacitor 106 couples the two stages of the transistor amplifier 15. In the second stage, the transistor 86 is employed as an active element. An emitter resistor 108 is connected with the transistor 86. This resistor is shunted by an RF bypass capacitor 110. DC voltage from conductor 56 is applied to the collector of the transistor 86 through an RF choke 112 and a resistor 114. A capacitor 116 and a resistor 118 afford feedback from the collector of transistor 86 of the second stage of the two stage amplifier 15 to the emitter of transistor 84 of the first stage.

The operation of the probe 16 of FIG. 2 will now be described in detail. In the probe 16, an RF choke 120 permits direct current from the conductor 56 to be applied to the collector of an NPN transistor 122 while precluding the transmission of any RF from the conductor 56 to the collector of this transmission of any RF from the conductor 56 to the collector of this transistor. Sensing coil 18 of FIG. 1 is shown in FIG. 2 to be connected in shunt with a capacitor 124 to form an LC tank circuit. One terminal of this LC tank circuit is connected with the collector of the transistor 122. The other terminal of this LC circuit is connected to RF ground by way of a bypass capacitor 126. Capacitor 128 couples RF from the RF amplifier 15 to the base of the transistor 122. Additionally, resistor 130 cooperates with the capacitor 128 to set the DC bias point for the base of the transistor 122 in a conventional manner.

The RF signal at the base of the transistor 122 biases that transistor conductive a portion of each RF cycle. During these conductive periods, current is applied to the parallel inductance, capacitance circuit comprised of coil 18 and capacitor 124. When the coil 18 is energized, it radiates a magnetic field in accordance with the laws of electromagnetic radiation which causes an interaction in operation between the coil 18 and the teeth of the toothed wheel 22 of FIG. 1, which, as noted above, is formed of a nonmagnetic metallic material. The nature of this interaction is most readily comprehended by considering the metallic toothed wheel 22 and the sensing coil 18 as secondary and primary transformer windings, respectively. By way of this transformer analogy, it is seen that eddy currents induced in the toothed wheel 22 flow unimpeded; accordingly, a loading effect is transferred to the primary of the transformer, i.e., the sensing coil 18. This loading causes the inductance of the coil 18 to vary and, concomitantly, the impedance of the LC tank circuit is varied at any selected frequency. In this manner, it is seen that the impedance of the tank circuit comprised of coil 18 and capacitor 124 is varied as the toothed wheel rotates.

The impedance of the LC tank circuit comprised of coil 18 and capacitor 124 is frequency dependent and, accordingly, varies with frequency in the manner characteristic of LC parallel resonant circuits. Thus, it is appreciated that this LC tank circuit has a substantially bell-shaped impedance versus frequency characteristic curve. As it is generally defined, the resonant frequency of the parallel resonant circuit is that frequency associated with maximum impedance of the impedance versus frequency curve. As the toothed wheel 22 of FIG. 1 rotates, the inductance of the coil 18 varies in the manner set forth above. Accordingly, the resonant frequency of the LC tank circuit which is a function of both the inductance and the capacitance of the LC circuit shifts as the inductance of coil 18 varies. Thus, it is appreciated that the generally bell-shaped impedance versus frequency characteristic curve shifts along the frequency axis as the inductance of the coil 18 is varied. As the toothed wheel rotates, the passage of each combination of a tooth and an air gap past the sensing coil 18 causes one cycle in the variation of the inductance of the coil 18 and one traversal of the impedance versus frequency curve along the frequency axis.

The frequency of the signal applied to the base of the transistor 122 from the RF signal source 14 is slightly lower than the resonant frequency of the LC tank circuit when the resonant frequency is at the lowest value it assumes during the cyclic variations. It is noted that this RF sinusoidal wave which appears across the LC tank circuit comprised of coil 18 and capacitor 124 has a frequency equal to the frequency of the RF signal generated by the tunnel diode oscillator 13. Since the impedance versus frequency characteristic curve of the tank circuit is continually shifting along the frequency axis, the instantaneous impedance of the LC tank circuit at the frequency of the applied signal continually varies. These impedance variations across the tank circuit cause an amplitude modulation of the RF signal impressed thereon. This amplitude modulation has a frequency which is a function of the speed of rotation of the toothed wheel 22. It is noted that the frequency of the RF source could also be selected as a frequency greater than the highest resonant frequency associated with the system's operation. The main criterion for selecting the frequency of the RF source is that it is desirable to have wide variance in the impedance levels of the LC tank circuit at the selected frequency as the impedance versus frequency curve shifts along the frequency axis.

Figure 3:
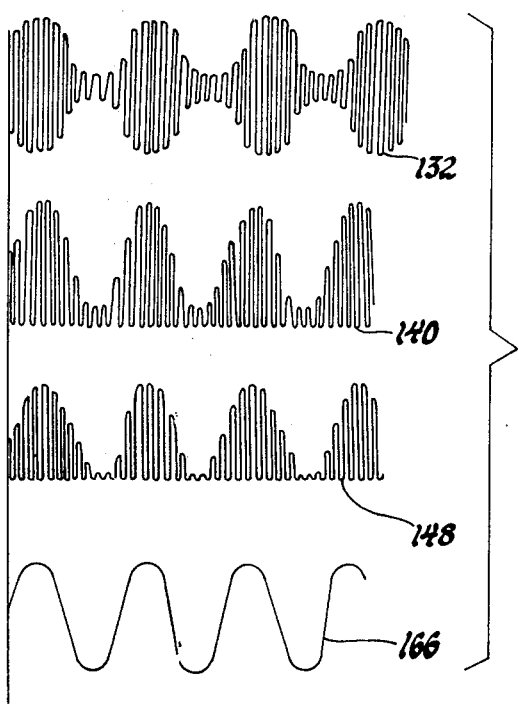
FIG. 3 is a set of curves showing various voltages developed in the tachometer system of FIG. 2 during operation.

The resultant amplitude modulated signal 132 is depicted in FIGS. 2 and 3. The waveform 132 represents the voltage developed across the RF tank circuit comprised of sensing coil 18 and capacitor 124 when the tachometer is in operation and, as noted above, is amplitude modulated in accordance with the effects of the rotating toothed wheel 22 of FIG. 1.

The amplitude of the modulation envelope of the amplitude modulated signal is doubled in the network comprised of the NPN transistor 134, capacitor 136, and resistor 138. The capacitor 136 cooperates with the base-emitter junction of transistor 134 when the base-emitter junction is reverse biased to function as a clamp circuit, clamping the voltage to a predetermined minimum value. This is accomplished in accordance with the Zener breakdown concept of semiconductor diode operation wherein the reverse bias which can be applied to the Zener diode has a maximum value at which breakdown occurs. For the transistor 134 to function as a clamp, the reverse biased base-emitter junction of the transistor is permitted to break over into the Zener mode by application of a reverse bias which exceeds its breakdown voltage. During periods of forward bias, the base-emitter junction of transistor 134 operates in the circuit essentially as a diode. Thus, the capacitor 136 is periodically charged and discharged causing it to have a varying DC level which varies at the frequency of the modulation envelope. Accordingly, clamping action is effected with the circuit described and the amplitude of the modulation signal is doubled. Resistor 138 provides bias to the base of transistor 134 in the eventuality that the RF swing falls below that necessary for normal operation.

Waveform 140 in FIGS. 2 and 3 is representative of the voltage developed at the base of transistor 134. Contrast of this waveform with waveform 132 shows graphically the magnitude doubling of the modulation signal which is realized. It is noted that the lower extremes of the RF signal traversals are clamped to a constant predetermined voltage value.

If it is desired not to utilize the Zener characteristic of transistor 134 in a manner described above, the system can be provided with Zener diode 144 and diode 142 connected as shown in FIG. 2. In this modified arrangement the Zener diode 144 is selected to have a lower breakdown voltage than does the base-emitter junction of transistor 134 when reverse biased. Accordingly, when the diode 142 and the Zener diode 144 are included, the breakover of Zener diode 144 precludes this mode of operation for the base-emitter junction of transistor 134. The net result on the signal as developed at the output of the transistor is the same; namely, the magnitude of the amplitude modulation is doubled. It, therefore, will be understood that in practicing this invention the Zener characteristic of transistor 134 can be utilized in which case Zener diode 144 and diode 142 are not required or these elements can be utilized in a manner explained above.

Resistor 146 of the detector 20 is provided as an emitter resistor for transistor 134. Accordingly, the output of the transistor 134 is developed across this resistor 146. The waveform of the voltage developed across this resistor is depicted as waveform 148 in both FIGS. 2 and 3.

The amplitude modulated signal developed across the resistor 146 is applied to a conventional diode detector comprised of a diode 150, a resistor 152, and a capacitor 154. This diode detector feeds an emitter follower amplifier stage incorporating transistor 156, resistor 158, capacitor 160, capacitor 162, and RF choke 164. DC is applied to the collector of the transistor 156 from the conductor 56 through the RF choke 164. The output of this emitter follower stage is a sinusoid whose frequency is equal to the frequency of the modulation signal developed at the pickup coil 18. This sinusoid is depicted as waveform 166 in FIGS. 2 and 3. This signal frequency is representative of the speed of rotation of the motor shaft. It is this signal which is coupled through capacitor 168 to the signal adder 34 of FIG. 1 to be combined with the slip signal in such a manner that the output of the adder will have a frequency related to the motor shaft speed and the desired slip frequency.

From the description set forth above, it is seen that the tachometer system develops an output signal which is indicative of the speed of rotation of the toothed wheel carried by a rotating shaft sought to be monitored. It will further be appreciated that the tachometer provides enhanced sensitivity by providing an arrangement that doubles the amplitude of the induced signal representing the speed of rotation of the rotating member being monitored.

I claim:

1. An electrical tachometer for providing a signal which is indicative of the speed of rotation of a rotating member, comprising:
   an RF signal source,
   a tank circuit comprised of parallel connected capacitive and inductive circuit elements coupled to said RF signal source,
   means driven by said rotating member and coupled to one of said circuit elements of said tank circuit for varying the impedance of said tank circuit at the frequency of said RF source as a function of the speed of rotation of said rotating member whereby, said tank circuit provides an amplitude modulated signal whose modulation envelope has a frequency which is a function of the speed of rotation of said rotating member,
   an electrical circuit coupled to said tank circuit for developing an amplitude modulated signal in which the amplitude of the modulation envelope is substantially twice the amplitude of the modulation envelope developed in said tank circuit, said electrical circuit comprising a capacitor and a transistor having a collector, emitter and base,
   means connecting said capacitor serially with the base-emitter circuit of said transistor across said tank circuit,
   means connecting the collector-base circuit of said transistor across said tank circuit,
   the base-emitter circuit of said transistor being periodically reverse biased and driven conductive in a reverse direction by the signal applied to the base-emitter circuit of said transistor from said tank circuit,
   and a detector coupled to said transistor for providing a signal the frequency of which is a function of the speed of rotation of said rotating member.

2. An electrical tachometer for providing a signal which is indicative of the speed of rotation of a rotating member, comprising:
   an RF signal source,
   a tank circuit comprised of parallel connected capacitive and inductive circuit elements coupled to said RF signal source,
   means driven by said rotating member and coupled to one of said circuit elements of said tank circuit for varying the impedance of said tank circuit at the frequency of said RF source as a function of the speed of rotation of said rotating member whereby, said tank circuit provides an amplitude modulated signal whose modulation envelope has a frequency which is a function of the speed of rotation of said rotating member,
   an electrical circuit coupled to said tank circuit for developing an amplitude modulated signal in which the amplitude of the modulation envelope is substantially twice the amplitude of the modulation envelope developed in said tank circuit, said electrical circuit comprising a capacitor, a Zener diode, a diode and a transistor having a collector, emitter and base,
   means connecting said diode and Zener diode in series across the base-emitter circuit of said transistor with the cathode of said diode connected to the base of said transistor and with the cathode of said Zener diode connected to the emitter of said transistor,
   means connecting said capacitor serially with the parallel combination of said diodes and the base-emitter circuit of said transistor across said tank circuit,
   means connecting the collector-base circuit of said transistor across said tank circuit,
   the breakdown voltage of said Zener diode being less than the reverse breakdown voltage of the base-emitter junction of said transistor whereby, the signal applied to said electrical circuit from said tank circuit periodically drives said Zener diode conductive,
   and a detector coupled to said transistor for providing a signal the frequency of which is a function of the speed of rotation of the rotating member.

3. An electrical tachometer for providing a signal which is indicative of the speed of rotation of a rotating member, comprising:
   an RF signal source,
   a two terminal LC tank circuit, said LC tank circuit comprising a parallel connected sensing coil and capacitor,
   a transistor having a base, an emitter, and a collector,
   means connecting said RF signal source across said base and emitter of said transistor,
   means connecting said collector of said transistor with a first terminal of said LC tank circuit,
   a bypass capacitor connecting the second terminal of said LC tank circuit to said emitter of said transistor,
   a source of direct current,
   means connecting said source of direct current between said emitter and said second terminal of said LC tank circuit whereby, said transistor is controlled in accordance with said RF signal source and an RF signal is developed across said LC circuit,
   means driven by said rotating member for causing the inductance of said sensing coil to vary in accordance with the rotation of said rotating member whereby, the RF signal developed across said LC tank circuit is amplitude modulated,
   a clamping circuit including a capacitor and a Zener diode coupled to said LC tank circuit for providing an amplitude modulated output signal wherein the amplitude of the modulation envelope is substantially twice that supplied by said tank circuit,
   and a detector coupled to said clamping circuit for providing a signal the frequency of which is a function of the speed of rotation of said rotating member.

4. An electrical tachometer for providing a signal which is indicative of the speed of rotation of a rotating member, comprising:
   a two terminal LC tank circuit, said LC tank circuit comprising a parallel connected sensing coil and capacitor,
   a first transistor having a base, an emitter, and a collector, means connecting said collector of said first transistor to a first terminal of said LC tank circuit, a bypass capacitor connecting the second terminal of said LC tank circuit with said emitter of said first transistor, an RF signal source, means connecting said RF signal across the base and emitter of said first transistor, a source of direct current, means connecting said source of direct current between said emitter of said first transistor and said second terminal of said LC tank circuit whereby, said transistor is controlled in accordance with said RF signal source and an RF signal is developed across said LC tank circuit, a metallic wheel having circumferentially disposed alternate teeth and notches driven by said rotating member, said metallic wheel rotating in close proximity to said sensing coil of said LC tank circuit to thereby cause the inductance thereof to vary in accordance with the rotation of said rotating wheel whereby, the RF signal developed across said LC tank circuit is amplitude modulated, amplitude modulation doubling means coupled to said LC tank circuit for providing an output signal wherein the amplitude of the modulation envelope is substantially twice that provided by said tank circuit, said doubling means comprising a capacitor and a second transistor having a base, an emitter, and a collector, means connecting said capacitor serially with the base-emitter circuit of said second transistor across said LC tank circuit, means connecting the collector-base circuit of said second transistor across said LC tank circuit, the base-emitter emitter circuit of said second transistor being periodically reverse biased and driven conductive in a reverse direction by the signal applied to said second transistor from said LC tank circuit, and a detector coupled to said second transistor for providing a signal the frequency of which is a function of the speed of rotation of said rotating member.